B. BUNCE & R. SALT.
Hot Air Register.
No. 124,663. Patented March 19, 1872.
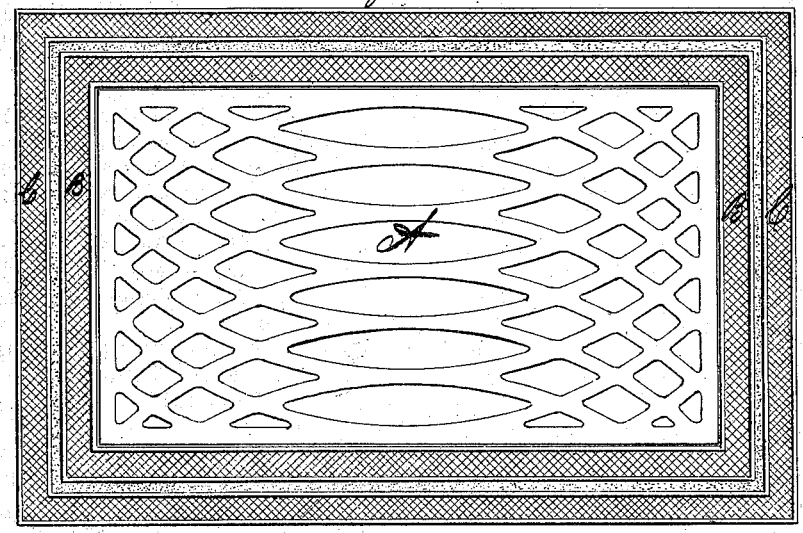
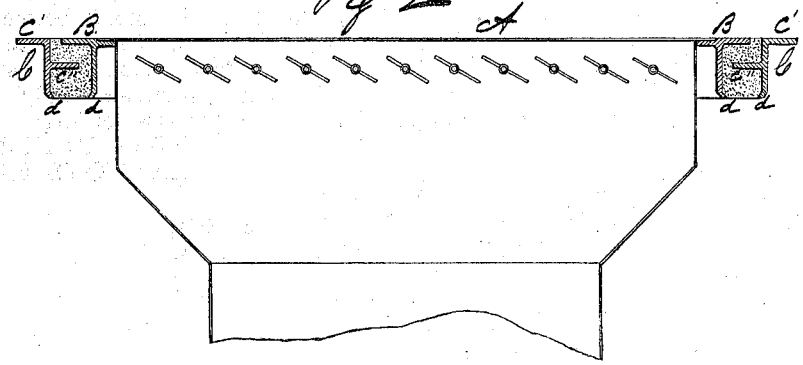
Witnesses
Wm. Mont Storm
Joseph. D. Haynes
Benjamin Bunce
Raymond Salt
Joint Inventors

UNITED STATES PATENT OFFICE.

BENJAMIN BUNCE AND RAYMOND SALT, OF NEW YORK, N. Y.

IMPROVEMENT IN HOT-AIR REGISTERS.

Specification forming part of Letters Patent No. 124,663, dated March 19, 1872.

SPECIFICATION.

We, BENJAMIN BUNCE and RAYMOND SALT, of the city, county, and State of New York, have invented a certain Improved Fire-Safety Hot-Air Register-Frame for the "registers" of hot-air furnaces for warming dwelling-houses, &c., of which the following is a specification:

The object of our invention is to supply a frame cheaper than those of soap-stone now in use, whose inner and outer parts (of metal) shall be firmly held in their proper relative positions, while at all points there shall be interposed between them, as a safeguard against the hot air causing the ignition of the wood-work surrounding the register-frame, a solid cement composed of a very poor conductor of heat, the cement being primarily in a semi-liquid condition, so that it may be poured in between the inner and outer curbs of the frame, as in a mold, and then harden. For this we propose to use plaster of Paris mixed, perhaps, with another ingredient, for a purpose hereinafter mentioned.

Figure 1 of the drawing is a plan view of our device, and Fig. 2 is a cross-section.

A is a register-disk, resting in a corresponding frame, B. Exterior to this is another frame, C, having an outer flange, $c'$, by which the whole is supported in the floor. C has also a flange, $c''$, extending entirely around it inwardly, which we call the "bracket" flange, for the reason that will be presently evident. Both C and B further have angulated flanges $d\ d$ around their bottoms and projecting toward each other, as shown, to lock in, so to speak, the cement when "set."

To apply the cement, B and C are laid concentrically on a smooth surface with their upper faces down, and the plaster of Paris, or other hard-setting cement, is poured in between $d\ d$ till the entire space between C and B is filled, and as soon as the cement is thoroughly set the frame is ready to use.

To insure perfectly solid contact between the hardened ring of cement and C and B despite any possible shrinkage of the cement on setting, we propose to admix with it (while made boiling hot in an open kettle) a portion of ground brimstone, which expands on cooling, and so would counteract any tendency to shrinkage of the other portion or ingredient of the cement employed.

It will be seen that the upper flange of B will, at its outer edge, have interposed between it and C about one-fourth of an inch of non-conducting cement.

It will be observed, also that, when pressure is brought upon B, the cement beneath is supported from being broken by the flange $c''$ on C, (and hence we term it the "bracket" flange,) and the support of any weight is thus transferred to $c'$ and the floor.

We claim—

Constructing a register-frame of two separated parts, as C and B, having either "bracket" or "locking" flanges, substantially as $c''$ and $d$, or both, and filling the space between the two such parts, C and B, with plaster of Paris or a hard-setting cement that shall be a bad conductor of heat, all substantially in the manner and for the purpose set forth.

BENJ. BUNCE.
RAYMOND SALT.

Witnesses:
WM. MONTSTORM,
JOSEPH D. HAYNES.